April 16, 1929. G. J. PATITZ 1,709,405
YEAST HANDLING APPARATUS
Filed July 8, 1926 6 Sheets-Sheet 1

INVENTOR.
Gerhardt John Patitz
BY
Mayer Warfield Watson
ATTORNEYS.

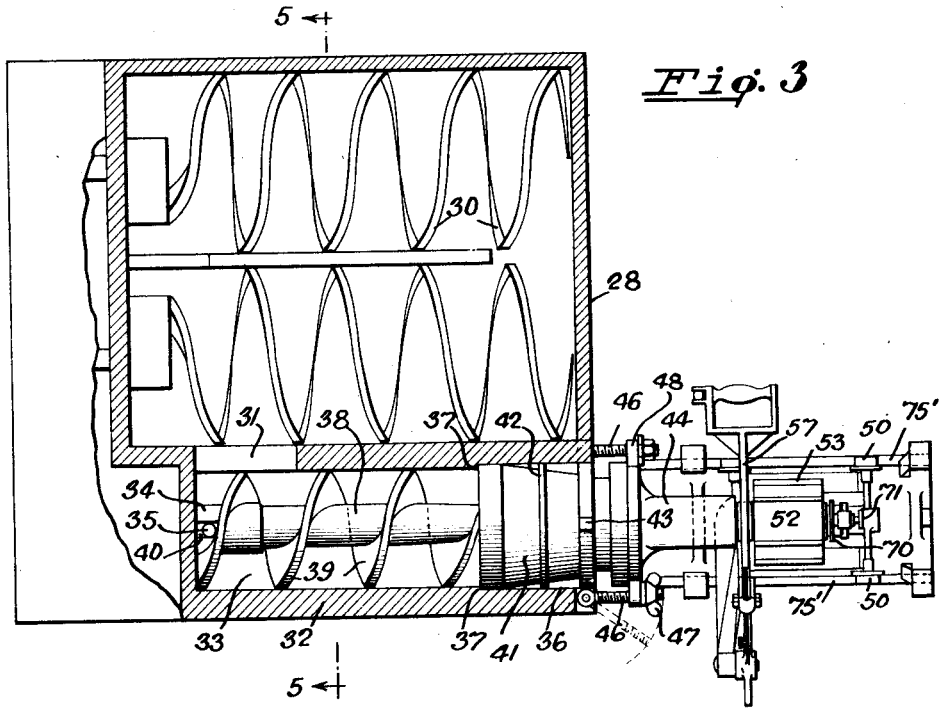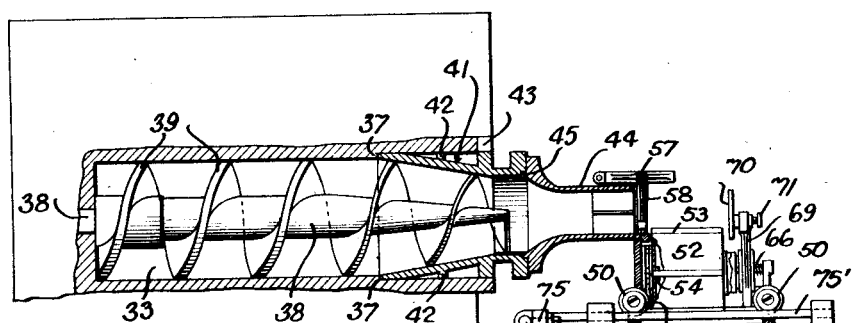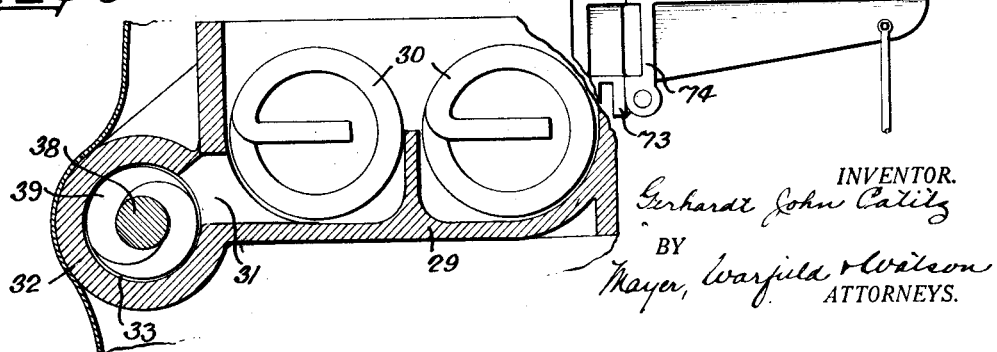

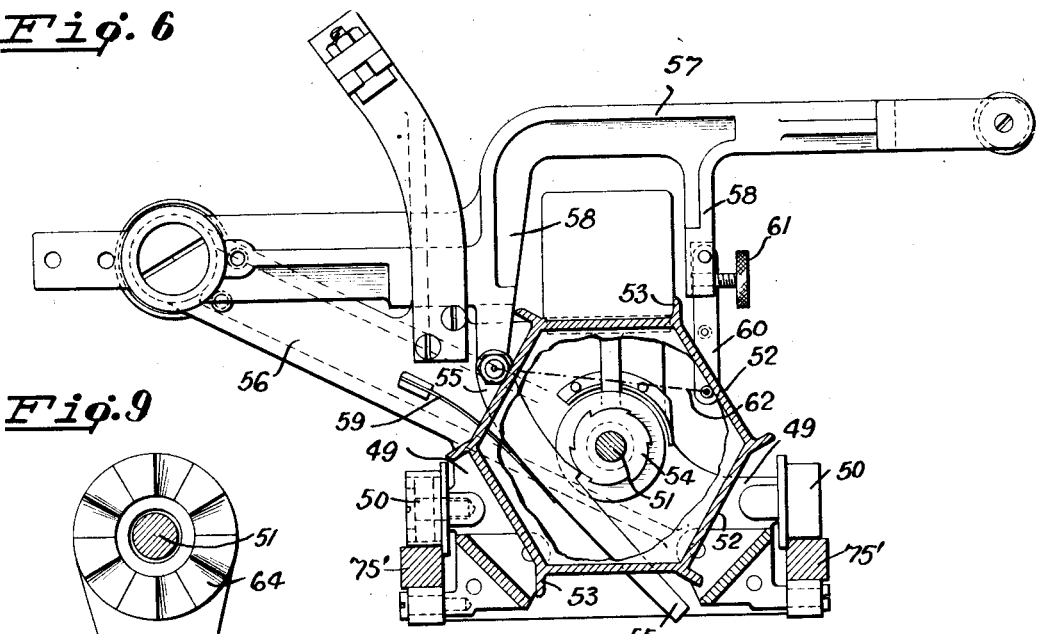
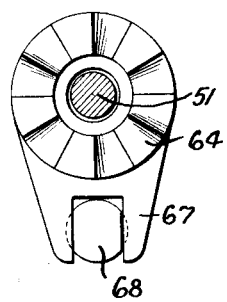
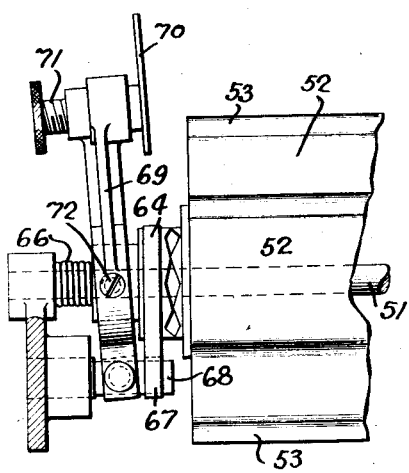
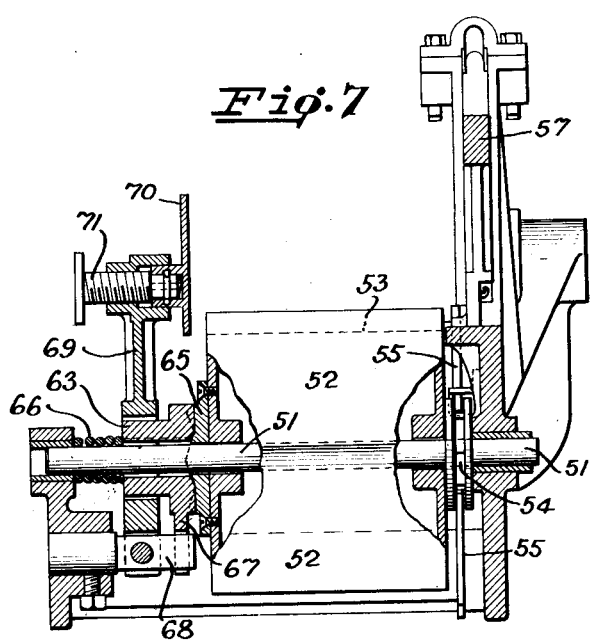

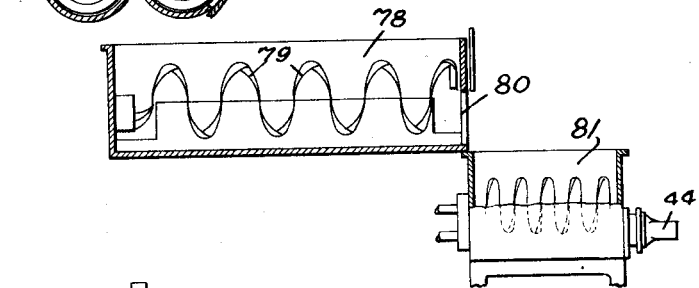
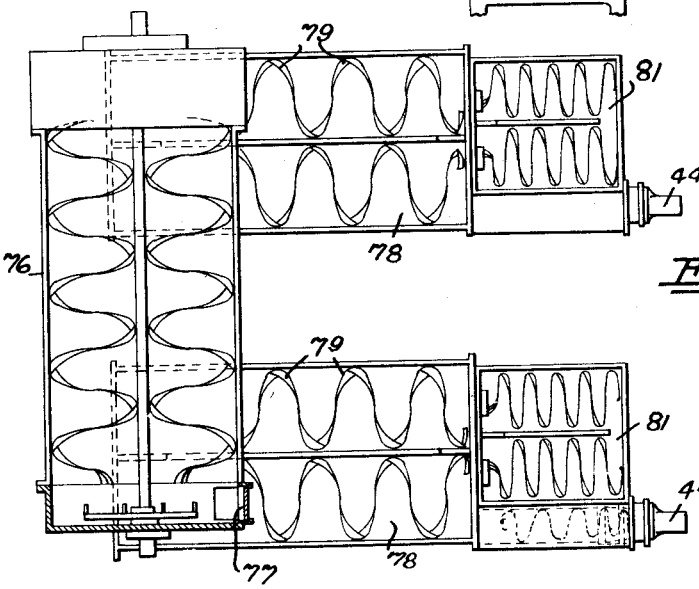
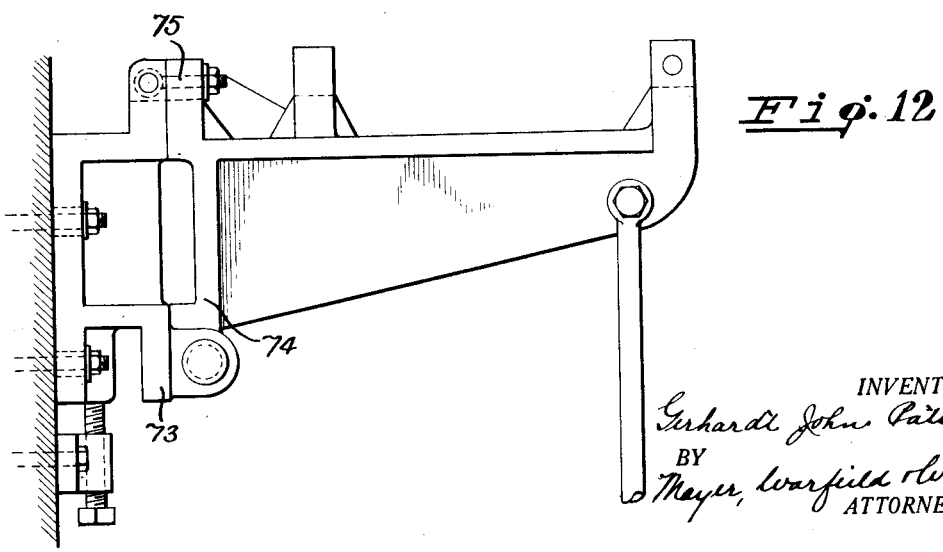

April 16, 1929.  G. J. PATITZ  1,709,405
YEAST HANDLING APPARATUS
Filed July 8, 1926  6 Sheets-Sheet 5
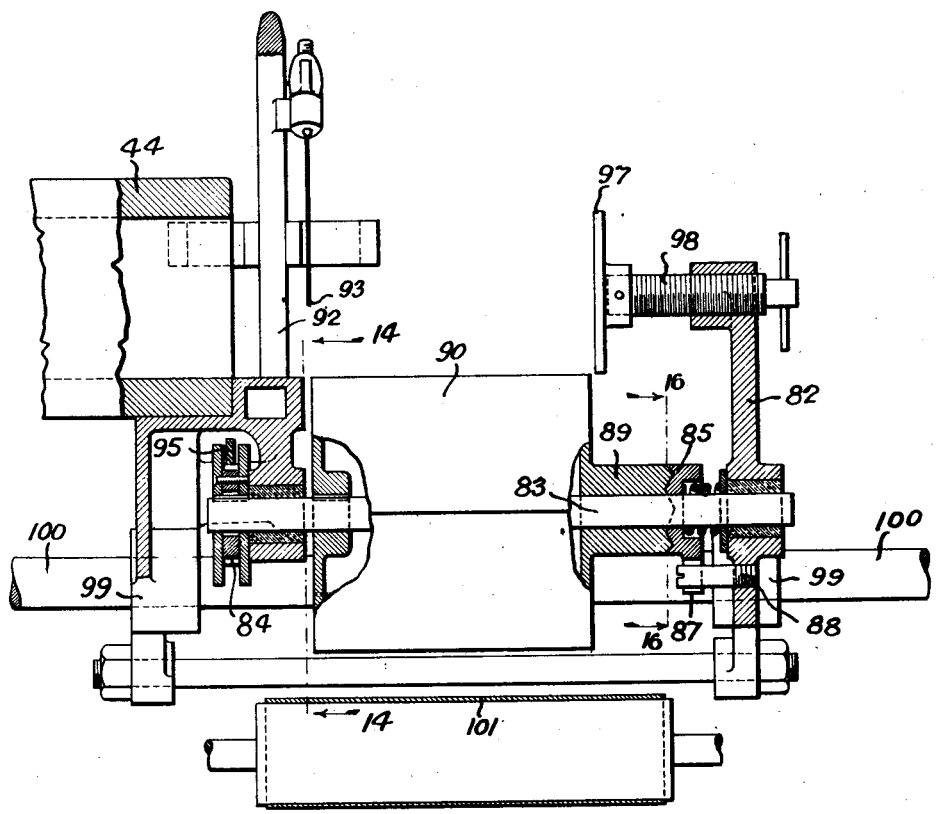
Fig. 13
Fig. 16
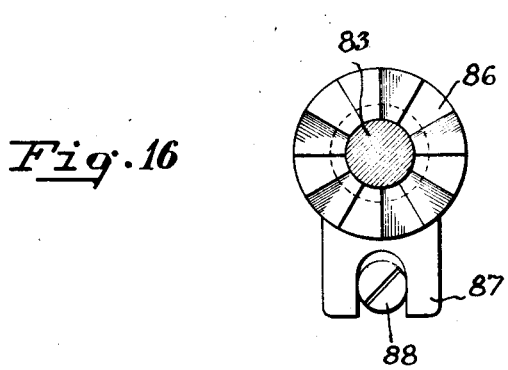
INVENTOR
Gerhardt John Patitz
BY Mayer, Warfield & Watson
ATTORNEYS April 16, 1929. G. J. PATITZ 1,709,405
YEAST HANDLING APPARATUS
Filed July 8, 1926 6 Sheets-Sheet 6
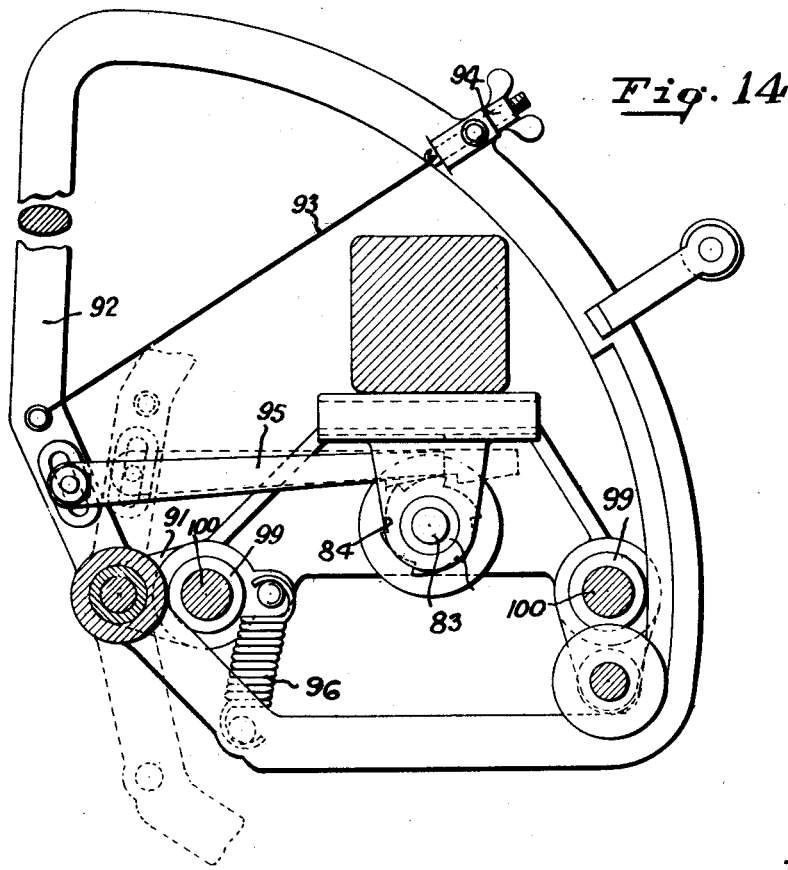
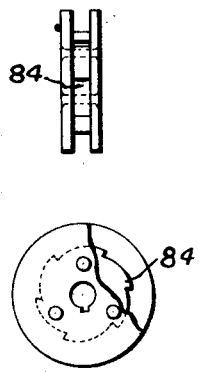
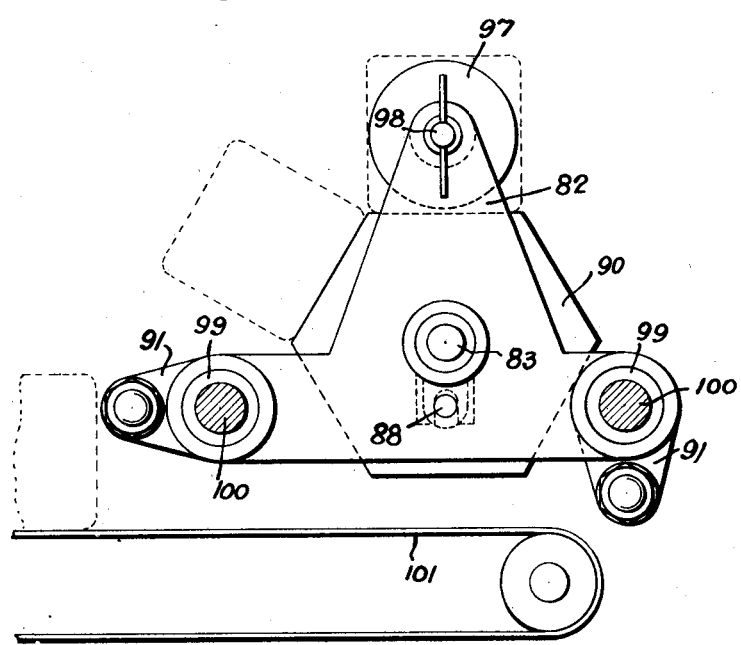

Patented Apr. 16, 1929.

1,709,405

UNITED STATES PATENT OFFICE.

GERHARDT JOHN PATITZ, OF PEEKSKILL, NEW YORK, ASSIGNOR TO THE FLEISCHMANN COMPANY, OF NEW YORK, N. Y., A CORPORATION OF OHIO.

YEAST-HANDLING APPARATUS.

Application filed July 8, 1926. Serial No. 121,258.

This invention relates to an improved machine for handling and cutting food products, and particularly yeast.

It is an object of the invention to provide a machine of this character by the use of which manual handling of the product will be reduced to a minimum.

It is a further object to construct a machine by means of which large quantities of material may be handled in a given interval of time and with a minimum of attendance.

A still further object of this invention is that of providing a machine in which, for example, the yeast, will be maintained in predetermined and proper condition during the entire handling thereof, and in which this material will be entirely uniform, both as to bulk and weight.

Another object is that of furnishing a machine in which the material is formed and cut into units of predetermined value, which latter are automatically delivered to a succeeding mechanism, for example, a wrapping machine, by means of which they are encased in condition for marketing.

An additional object is that of providing a machine which will perform efficiently the purposes for which it is intended, and which will also be economically and readily manufactured and easily assembled.

Other objects of the invention will in part be obvious and will in part appear hereinafter.

For a fuller understanding of the nature and objects of the invention reference should be had to the following detailed description taken in connection with the accompanying drawings, in which:

Fig. 3 is a sectional plan view of the hopper unit of the machine;

Fig. 4 is a side elevation of this unit;

Fig. 5 is a transverse sectional view taken along the lines 5—5 of Fig. 3;

Fig. 6 is a sectional end view of the cutting and delivering mechanism;

Fig. 7 is a sectional side view thereof;

Fig. 8 is a fragmentary elevation of the rear portion of this unit;

Fig. 9 is a face view of one of the details of the same;

Fig. 10 is a view similar to Fig. 2, showing a slightly different arrangement of the apparatus;

Fig. 11 is a plan view of the apparatus as shown in Fig. 10;

Fig. 12 is a side elevation of the mounting structure for the cutting and delivering mechanism;

Fig. 13 is a partly sectional side view of a second form of cutting and delivering mechanism which may be utilized;

Fig. 14 is a sectional view taken along the lines 14—14 and in the direction of the arrows of Fig. 13;

Fig. 15 is a rear view of the mechanism as shown in Figs. 13 and 14; and

Figs. 16, 17 and 18 show details of this unit of the machine.

Figure 1:
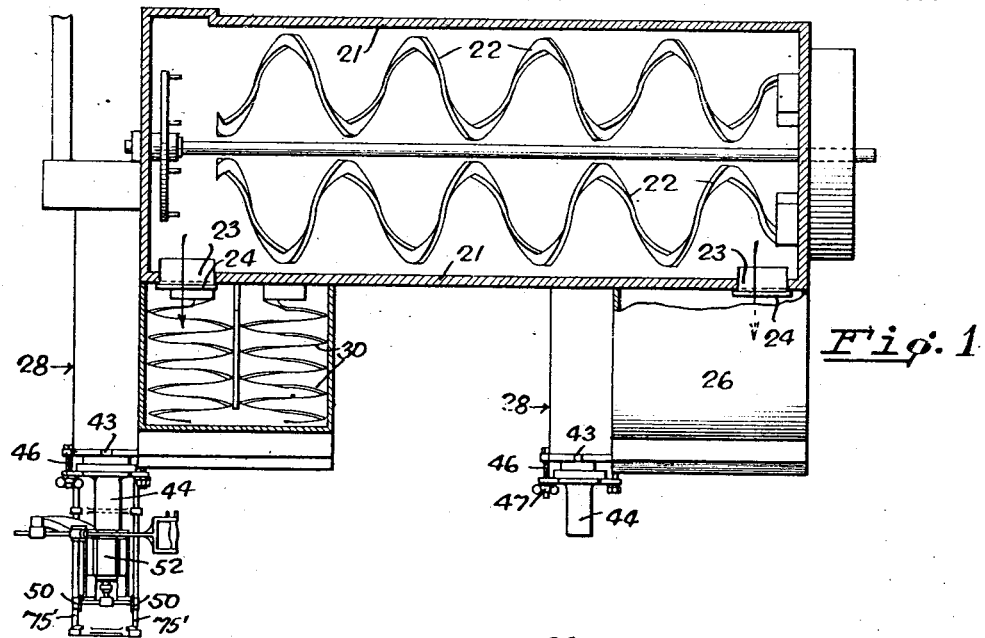
Figure 1 is a plan view of a machine embodying the construction of the present invention.
Figure 2:
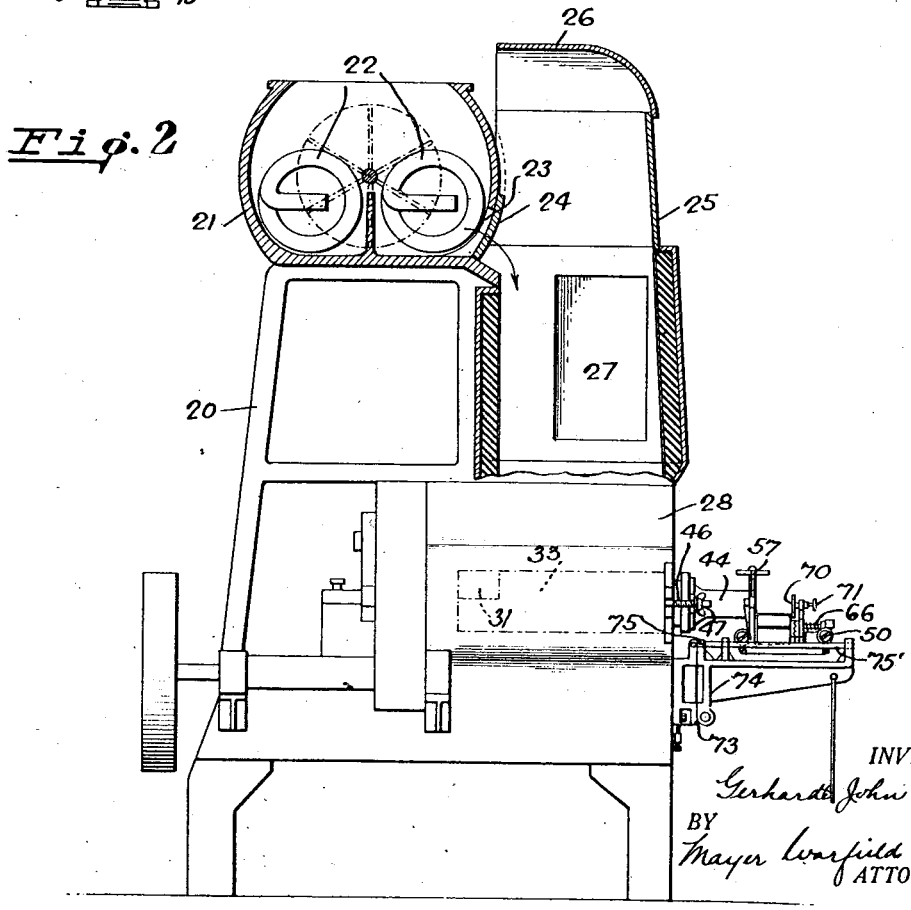
Fig. 2 is a partly sectional side elevation thereof.

In Figs. 1 to 5 inclusive the numeral 20 indicates a base at the upper end of which a mixer is supported, the latter including a casing 21, within which screws 22 are rotated in any suitable manner. Openings 23 are formed in the inner side face of the casing and the passage of yeast through these openings is controlled, for example, by means of sliding doors 24. Also mounted upon the base 20 and adjacent the opposite side from that upon which the mixer is mounted are one or more vertically-extending casings 25, which provide chutes for the passage of the material from the mixer to the hoppers hereinafter described, the number of these casings corresponding to the number of hopper units. Each of these casings preferably includes a cover 26 to prevent the spillage of yeast and entrance of foreign matter into the same, and a door 27 may also be provided so that an operator may gain access to the casing interior. Immediately below the lower end of each chute, and having its upper end in communication therewith, is a hopper unit which includes side walls 28 and a base 29 providing a receptacle within which strap-screws 30 operate, the latter being driven in any suitable manner.

Adjacent its rear end, one of the side walls of the hopper is formed with an opening 31, and the side wall at this point is extended to provide a casing 32, furnishing a chamber 33. Projecting into the forward end of this chamber is a stub-shaft 34 carrying a transversely extending pin 35, and this chamber embraces in the present embodiment a substantially constant bore which is varied only adjacent the rear end thereof by a slightly enlarged portion 36 providing a shoulder 37. A compression worm is mounted within this bore and includes a shaft 38, from which a spirally-disposed fin 39 extends. The body or shaft of this worm is tapered adjacent its discharge end, and the diameter of the convolutions of the fin is correspondingly reduced at this point. The rear end of the shaft 38 is notched as at 40 in order to provide a slot for the reception of the pin 35, it being understood that the shaft is also recessed so as to accommodate the forward end of the stub-shaft 34.

In order to retain the worm in a position in which it is properly mounted, a sleeve 41 is inserted into the rear end of the chamber 33 until the inner sleeve edge strikes the shoulder 37. The bore to this sleeve is tapered to correspond to the decrease in diameter of the rear end of the worm, thus cooperating therewith to provide a bearing for the worm and a compression end for the chamber within which it is disposed, it being noted that the rear bore end of the sleeve is of substantially constant cross-sectional area, for a purpose hereinafter brought out. The sleeve may have a plurality of annular ribs 42 on its outer face, which slidably engage the face of the bore to normally prevent relative sidewise movement of the sleeve with respect to the chamber; and one of these ribs preferably has an extending lug-portion 43 which fits into a corresponding notch in the casing, so that rotation of the sleeve is also definitely precluded when the latter is forced home within the housing of the machine.

Mounted adjacent the rear end of the sleeve and forming a continuation of the bore thereof is a forming die or nozzle 44, these parts being preferably interlocked by providing a suitable rib 45 on the latter which extends into a correspondingly recessed portion formed in the outer end of the sleeve. In order to retain these latter parts in position, a pair of bolts 46 may be suitably secured to the housing of the machine adjacent the rear end of the wall providing the compression chamber 33. Each of these bolts mounts a wing-nut 47, and the die 44 may be formed with extended forked portions 48, between the arms of which the bolt bodies lie. Thus, it is obvious that when the parts are in the position shown, and the wing-nuts are tightened, they will draw the nozzle 44 into intimate contact with the outer end of the sleeve, and the latter will in turn be forced into corresponding engagement with the shoulder within the bore of the chamber 33, thus retaining the parts in position.

Arranged immediately to the rear of the die 44 is a cutting and delivery mechanism, which may include a structure of the nature shown in Figs. 6 to 9 inclusive. In these views the numeral 49 indicates a carriage having rollers 50. Mounted between the carriage ends is a shaft 51, which supports a receiving and delivery member 52 of hexagonal shape fins 53 being provided at the ends of each of the surfaces thereof and extending in the present embodiment substantially at right angles to one adjacent surface and at an obtuse angle to another of the same, for a purpose hereinafter brought out. Also attached to the shaft is an annular ratchet 54, this ratchet being preferably positioned at a point in advance of the member 52. A pawl 55 cooperates with the teeth of this ratchet in order to rotate the shaft as well as the receiving and delivering member.

The carriage supports an arm 56 adjacent the outer end of which a lever 57 is pivotally mounted, this lever having a pair of depending arms 58, to the innermost of which the inner end of the pawl 55 is pivotally attached. In order to assure a constant engagement of the pawl with the ratchet surface, a spring 59 may be employed, it being thus obvious that as the lever 57 is swung downwardly the pawl and ratchet will engage to rotate the shaft 51; while when the lever is swung upwardly lost motion will occur between these parts. Secured to one of the arms 58 is a link 60, which may be swung to extend at an angle with respect to the arm by means of a set-screw 61. Attached to the outer end of this link is one end of a wire 62, the opposite end of which is attached to the innermost arm 58 at a point adjacent the outer end of the same, it being here noted that this wire will preferably have its body extending at a tangent to the point of pivotal connection of the lever 57, and that the wire is mounted in such a position that when the lever is swung downwardly it will pass into the space extant between the forward end of the carriage and the body of the member 52.

A collar 63 is mounted upon the shaft 51 for rotation with respect thereto, and has its inner face in the form of cam surfaces 64. A plate 65 having corresponding surfaces is fixedly secured to the rear face of the member 52, the cam surfaces of these two elements being interengaged preferably by encircling the shaft 51 with a spring 66, which has one of its ends bearing against a bracket supporting the rear end of the shaft, its opposite end bearing against the collar 63. In order to prevent a movement of this collar in a direction other than substantially axially with respect to the shaft 51, its body may be extended as at 67 and engage a pin 68 projecting inwardly from the rear end of the carriage. This pin pivotally mounts a lever 69 extending to a point adjacent the uppermost surface of the member 52 and at this point it supports a stop-plate 70 by means of a set-screw 71, which renders the former adjustable toward and away from the rear edge of the member 52. The lever 69 has a portion encircling the rear end of the collar 63, and these elements are operatively connected by means of pins 72, so that when the collar is moved rearwardly the lever and parts carried thereby will be swung from the position shown in Fig. 7 to that shown in Fig. 8, it being appreciated that this swinging of the parts occurs incident to the fact that the body of the member 52 is rotated resulting in a rotation of the plate 65, and a camming action between the surfaces thereof and the surfaces 64 of the collar, which obviously forces the latter rearwardly against the tendency of the spring 66, which returns the parts to the position shown in Fig. 7—according to the present embodiment—and turns the shaft 51 through the latter part of its one-sixth of a revolution and after the pawl ceases to operatively engage the ratchet.

As shown in Figs. 1 to 4 and Fig. 12, the body of the machine supports a bracket 73, to which a bracket 74 is pivotally secured, the body of the latter, however, being normally maintained in a plane at right angles to the body of the former by any suitable type of fastening element 75. The bracket 74 mounts rails 75', and the rollers 50 of the carriage grip these rails at points above and below the same, so that the carriage may freely move from one end of the bracket to the other end thereof without the possibility of accidental detachment occurring.

Thus, according to the machine shown in the preceding views, a batch of yeast is placed within the mixer, where it is circulated and agitated and its individual parts are intermingled. After the mixture is ready for use the valves or doors 23 are opened, and the material passes downwardly through the chutes into the hopper. At this time it will be understood that each casing 25 acts to a certain extent as a reservoir receiving any material in excess of the amount capable of reception by the hopper body, and this excess material is fed to the hopper body as the yeast is fed from the compression chamber. Any adhesion of the material to the inner faces of the casing 25 may be remedied by an operator passing a suitable implement through the door 27. It will also be understood, as has been indicated in Fig. 2, that parts of the machine may be suitably insulated to prevent the influx of outside heat to the material and consequent condensation which would interfere with the quality thereof.

The screws within the hopper will maintain the material in friable condition and urge it toward the outlet opening 31 into the compression chamber. Although this chamber has been provided in the present exemplification by the casing 32 and the collar, it will be appreciated that a different construction might be utilized. Also, while, as described, the chamber passage of constant cross-sectional area forms a part of the collar, a different construction might be adopted. In the chamber the material will be initially merely urged toward the outlet end thereof. However, due to the cooperation of the fin with the compression end of the chamber, the material will be vigorously compacted, and due to the constant passage forming a continuation of the chamber, all voids in the material will be eliminated. By virtue of the shape of the die 44 the yeast will emerge therefrom in the form of bars and move over the uppermost surface of the member 52 until such time as the outer end of the material is at a point immediately adjacent the plate 70. The wire 62 will have been previously tensioned by means of the set screw and the operator will now swing the lever 57 downwardly, thus causing the wire to sever the bars from the material emerging from the die or nozzle 44. At this time it will be observed that due to the fact that the wire preferably does not extend in a plane intersecting the pivot of the lever 57, the cutting action thereof will be far more efficacious than would otherwise be the case. A continued depression of the lever 57 will cause the pawl 55 to operatively engage the ratchet 54, which will result in a turning of the member 52. As viewed in Fig. 6, this turning will be in a counter-clockwise direction, so that the fin 53 at the right-hand side of the uppermost surface in this figure will engage the corresponding side face of the yeast bar to prevent any possibility of displacement of the latter with respect to the body of the member 52. Simultaneously with this turning of the member the plate 70 will be moved rearwardly to the position shown in Fig. 8, so that any tendency of the forward end of the yeast bar to adhere to this plate will be overcome. Thus, due to the fact—as in Fig. 6,—that the left-hand fin 53 of the uppermost surface is inclined to this surface, the yeast bar will readily drop therefrom, when the member 52 has completed less than one-sixth of a revolution, onto the conveyor, hereinafter described, which leads to the wrapping machine.

It is obvious that the plate 70 serves as a gauge for the operator in ascertaining the proper length of the bar, and it will be understood that as the aforedescribed severing and delivery operations occur, material will continue to emerge from the nozzle, and consequently the carriage will move along its rails. The same action will occur in the event that an operator does not give attention to the functioning of the machine and fails to sever the bar immediately upon the outer end of the latter reaching a point adjacent the surface of the plate 70. If this should happen, the carriage will be shifted along the rails so as to prevent wastage of the material, it being understood that, due to the fact that the cutter is mounted upon the carriage, the length of the severed bar section will be equal at all times to the length of preceding and succeeding sections. After the severing and delivery operations are completed, the operator, by simply raising the lever 57 and subsequently shifting the carriage towards the nozzle, will restore the parts to their initial position, at which they are ready for the succeeding operation.

When the hopper, compression chamber and worm are to be cleaned, this may readily be accomplished by simply loosening the fastening element 75 of the bracket 74 and permitting the latter to swing downwardly, carrying with it the cutter and delivery mechanisms. In such position of the parts the nozzle 44 is entirely free from any obstruction, and an operator, by loosening the wing-bolts 47, may remove this nozzle and subsequently withdraw the compression sleeve 41, after which the compression worm, by being moved axially, may be completely removed from the bore 33.

In the form of machine shown in Figs. 10 and 11, a mixer 76 is provided, which may be of any desired construction, and the material from which is discharged through door-controlled openings 77. Instead of the material dropping directly into the hopper, the material in the present exemplification moves into a storage chamber 78, having agitating end-circulating screws 79. From this chamber it moves through an outlet opening 80 into a hopper 81, which may correspond in all respects to that previously described, and from the latter it moves to the compression chamber, and so to the cutting and delivery mechanism. Among other advantages, this arrangement prevents a clogging of the machine. According to the construction shown in Figs. 1 to 5, inclusive, the material, after filling the hopper, piles up within the casing 25, from which it feeds into the hopper as the yeast is expressed from the nozzle. While within the casing 25 the material is obviously not being worked on, and may occasionally have a tendency to bridge or wedge, which might thus require momentarily loosening up of the clogged material by an operator so that the material may readily move downwardly through the same, this clogging happens but rarely however. According to the construction shown in Figs. 10 and 11, the mixer discharges periodically into the storage chamber 78, and the latter discharges continuously into the hopper 81, feeding the same just sufficient material to maintain constant the level thereof within its body.

In Figs. 13 to 18, inclusive, a second form of cutting and delivery mechanism has been shown, which may be used in lieu of the mechanism described in connection with Figs. 6 to 9, inclusive. In this second form of mechanism the carriage 82 supports a shaft 83, the latter having an annular ratchet 84 secured to one of its ends, its opposite end mounting a spring-pressed collar 85, which has its inner face formed with cam surfaces 86 and is extended as at 87 to provide a forked portion straddling a pin 88 secured to the carriage frame. The surfaces of this collar co-operate with corresponding surfaces formed at the rear end of a stud 89 which encircles the shaft and is an extension of the hexagonal supporting member 90 mounted upon this shaft. The carriage includes an arm 91, to which a yoke lever 92 is pivotally attached, this member supporting a wire 93, which may be tensioned by the wing-nut 94, and which, in common with the wire of the previously described cutter, is preferably not in line with the point of pivotal support of the lever, so that an efficient cutting apparatus is provided. The lever additionally supports the inner end of a pawl 95, the outer end of which co-operates with the ratchet 84, and the entire lever is normally maintained in the position shown in Fig. 14 by means of a spring 96 extending between the carriage and the lever.

Thus the bar of yeast or other material moves outwardly upon the upper surface of the member 90 until its outer end strikes the gauge-plate 97, which is adjustably supported upon an extension of the carriage by means of a set-screw 98. Thereupon the operator will swing the lever 92 downwardly to sever the yeast bar, the latter in the meantime moving the carriage along the rails provided for this purpose. In this connection it will be noted that in lieu of the rollers the carriage is in this instance provided with enlarged portions 99 formed with openings accommodating the rails 100. The operator will now release the lever 92, which will move upwardly under the influence of the spring 96. During the downward stroke of the lever the pawl has lost motion with the ratchet, but during the upstroke thereof these elements co-operate to turn the member 90 one-sixth of a revolution, thus dropping the yeast bar of other material onto the conveyor 101, which delivers the same to the wrapping machine.

Thus among others, the objects specifically aforementioned, are accomplished, and since it is intended that certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. A machine of the type described, including a mixer casing, a screw within the same for agitating material therein, a plurality of casings each providing a hopper positioned below and transversely of said first-named casing and receiving material by gravity from the former, material-compressing means associated with each of said hoppers, and means within each of the latter for agitating the material and causing a uniform flow of substantially all of the same toward said compressing means.

2. A machine of the type described, including a mixer casing, means within the same for mixing and circulating material, said casing being formed with a plurality of openings in one of its walls, means for controlling the flow of material through each of said openings, a plurality of hoppers arranged transversely of and in proximity to said casing and in a plane below the same and receiving each mixed material passing through a casing opening, means within each of the hoppers for agitating the material therein, and means associated with each of the hoppers for compressing said material.

3. A machine of the type described, including a casing, means for agitating and circulating material within the same, said casing being formed with a plurality of openings, means for controlling the flow of material through each of said openings, a plurality of hoppers arranged transversely of said casing to receive material passing through said openings, each of said hoppers being formed with an opening, material-compressing means arranged beyond each of said latter openings, and means within each of said hoppers for circulating and agitating material received from said first casing and causing a uniform flow of substantially all of said material toward said hopper opening.

4. A machine of the type described, including a mixer casing, a plurality of storage casings arranged transversely of and below said mixer casing, a hopper associated with each of said storage casings and below the same, material-compressing means, associated with each of said hoppers, the mixer casing, storage casings and hoppers each being formed with an opening, means associated with said mixer for agitating the material and urging the same through the casing openings to feed by gravity into said storage chambers, means associated with each of the latter for urging the received material toward the outlet opening thereof to feed by gravity to its associated hopper, and means within each of the latter for urging the material toward said compressing means.

5. A machine of the type described, including means providing a chamber, a collar positioned within the rear end of said chamber and being formed with a gradually constricted bore and having an external annular rib engaging with said chamber, said bore being continued beyond the constricted portion in the form of a passage of substantially constant-cross-sectional area, a worm within said chamber and having its rear end extending into and formed to correspond to the constricted portion of said chamber and terminating adjacent the end of the same, and means for operating said worm.

6. A machine of the type described, including a chamber having a substantially constant bore, a collar movably positioned within the rear end of said chamber, said collar presenting a bore of decreasing diameter, an annular ring between said collar and said chamber for normally retaining said collar against lateral movement, a compression worm disposed within said chamber and extending into and conforming to said collar, and means for operating said worm.

7. A machine of the type described, including a chamber having a substantially constant bore, a collar movably positioned within the rear end of said chamber, said collar presenting a bore of decreasing diameter, an annular ring between said collar and said chamber for normally retaining said collar against lateral movement, a compression worm disposed within said chamber and extending into and conforming to said collar, and means detachably connected with said worm for operating the same, said worm being removable from said chamber through the opening left by the removal of said collar.

8. A machine of the type described, including a chamber having a substantially constant bore and being provided with a shoulder adjacent the outer end thereof, a collar having its inner edge lying adjacent said shoulder and presenting a bore of decreasing diameter, an extension intermediate the ends of said collar and contacting with said chamber for normally retaining said collar against lateral movement with respect to said chamber, and a rotatable compression worm within said chamber and extending into and conforming to the bore of said collar.

9. A machine of the type described, including a compression chamber, a collar extending into the bore of the chamber and having a compression bore, an extension intermediate the ends of said collar and contacting with said chamber for preventing lateral movement of the collar with respect to said chamber, a forming nozzle associated with said collar, a worm within said chamber and extending into and conforming to the collar bore, and means engaging said nozzle to prevent a displacement of the same and said collar with respect to said machine.

10. A machine of the type described, including a chamber, a collar extending into said chamber and presenting a bore of decreasing diameter, a plurality of annular rings intermediate the ends of said collar and contacting with said chamber for preventing lateral movement of the collar with respect to said chamber, said chamber and one of said collars also having cooperating portions for preventing twisting movement therebetween, a separate nozzle at the outer end of said collar, means secured to said machine and engaging a portion of said nozzle for preventing movement of the same and said collar with respect to said machine, and a worm within said chamber and extending into and conforming to the bore of said collar.

11. A machine of the type described, including a chamber, material-compressing and -forming means therefrom by axial movement and removable therefrom by axial movement with respect thereto, material-cutting and -delivering means adjacent the outer end of said chamber, and a support swingingly secured to said machine and carrying said material-cutting and -delivering means whereby the latter may be swung to a position at which said material-compressing and -forming means may be removed.

12. A machine of the type described, including material-forming means, material-receiving and -cutting means, the latter including a lever pivotally mounted to swing in a substantially vertical plane transversely of said material-forming means and a cutting member associated with said lever and to be moved thereby, said cutting member being arranged in a plane to one side of the plane of pivotal mounting of said lever.

13. A machine of the type described, including material-forming means, material-receiving and -cutting means, said latter means including a carriage, a shaft supported thereby and disposed parallel to the line of movement of the material, a delivery member mounted on said shaft, means for actuating said delivery member, a second shaft disposed parallel to said first mentioned shaft, a cutting member mounted upon said second mentioned shaft, and means for actuating said cutting member.

14. A machine of the type described, including material-forming means, material-receiving and -cutting means, said latter means including a shaft, means for supporting the same in a line paralleling the line of movement of the material, a multi-faced receiving and delivering member mounted upon said shaft and receiving material upon its uppermost face, means for cutting said material, and means for actuating said shaft to move said member to deliver the cut material therefrom laterally of the line of movement of the formed material.

15. A machine of the type described, including material-forming means, material-receiving and -cutting means, the latter means including a shaft, means for mounting the same in a line paralleling the line of movement of the material, a multi-faced member carried by said shaft and adapted to receive material upon its uppermost face, means for severing the received material, and means for turning said member to deliver the same therefrom laterally of the line of movement of the formed material.

16. A machine of the type described, including material-forming means, material-receiving and -cutting means, the latter means including a shaft, means for mounting the same in a line paralleling the line of movement of the material, a multi-faced member carried by said shaft and adapted to receive material upon its uppermost face, means for severing the received material, means for turning said member to deliver the same therefrom laterally of the line of movement of the formed material, and a stop plate arranged adjacent the rear end of the uppermost face of the member.

17. A machine of the type described, including material-forming means, material-receiving and -cutting means, the latter means including a shaft, means for mounting the same, a multi-faced member carried by said shaft and adapted to receive material upon its uppermost face, means for severing the received material, means for turning said member to deliver the same therefrom, a stop plate arranged adjacent the rear end of the uppermost face of the member, and means for moving said plate substantially axially with respect to said member and during the turning thereof whereby to free the end of the mass of material upon said member from the face of said plate.

18. A machine of the type described, including material-forming means, material-receiving and -cutting means, the latter means including a shaft, means for mounting the same, a multi-faced member carried by said shaft and adapted to receive material upon its uppermost face, means for severing the received material, means for turning said member to deliver the same therefrom, and fins extending axially of said member and adjacent the side edges of the faces thereof, one of said fins extending at substantially right angles with respect to an adjacent face of said member, another of said fins extending at an obtuse angle with respect to such face.

19. A machine of the type described, including a shaft, means for rotatably supporting the same, a multi-faced member secured to said shaft and receiving material upon its uppermost face, means for severing the material thus received, an annular ratchet secured to said shaft, and a pawl associated with said severing means and cooperating with said ratchet to turn said shaft.

20. A machine of the type described, including a shaft, means for rotatably supporting the same, a multi-faced member secured to said shaft and receiving material upon its uppermost face, means for severing the material thus received, an annular ratchet secured to said shaft, a pawl associated with said severing means and cooperating with said ratchet to turn said shaft, a stop plate extending adjacent the rear end of the uppermost face of said member, and means associated with said plate and shaft for moving the former when the latter is turned to free the material from engagement with the face of the plate.

21. A machine of the type described, including a shaft, a lever positioned adjacent thereto, a ratchet secured to said shaft, a pawl carried by said lever and cooperating with said ratchet, a multi-faced material receiving member supported by said shaft, material severing means associated with said lever, said pawl engaging said ratchet upon said lever being actuated to rotate said shaft and deliver the material upon the uppermost face thereof, and means cooperating with said member for maintaining succeeding surfaces thereof in material-receiving position.

22. A machine of the type described, including in combination a shaft, a lever adjacent the same, material severing means connected with said lever, a multi-faced receiving member secured to said shaft, said severing means operating during one stroke of said lever, and means associated with said lever and shaft for rotating the latter as the lever is moved in an opposite direction.

In testimony whereof I affix my signature.

GERHARDT JOHN PATITZ.

said severing means and cooperating with said ratchet to turn said shaft, a stop plate extending adjacent the rear end of the uppermost face of said member, and means associated with said plate and shaft for moving the former when the latter is turned to free the material from engagement with the face of the plate.

21. A machine of the type described, including a shaft, a lever positioned adjacent thereto, a ratchet secured to said shaft, a pawl carried by said lever and cooperating with said ratchet, a multi-faced material receiving member supported by said shaft, material severing means associated with said lever, said pawl engaging said ratchet upon said lever being actuated to rotate said shaft and deliver the material upon the uppermost face thereof, and means cooperating with said member for maintaining succeeding surfaces thereof in material-receiving position.

22. A machine of the type described, including in combination a shaft, a lever adjacent the same, material severing means connected with said lever, a multi-faced receiving member secured to said shaft, said severing means operating during one stroke of said lever, and means associated with said lever and shaft for rotating the latter as the lever is moved in an opposite direction.

In testimony whereof I affix my signature.

GERHARDT JOHN PATITZ.

CERTIFICATE OF CORRECTION.

Patent No. 1,709,405.  Granted April 16, 1929, to

GERHARDT JOHN PATITZ.

It is hereby certified that error appears in the printed specification of the above numbered patent requiring correction as follows: Page 5, line 15, claim 2, strike out the words "one of" and line 19, for the words "receiving each" read "each receiving"; page 6, line 13, strike out the words "therefrom by axial movement" and insert instead "associated with said chamber"; and that the said Letters Patent should be read with these corrections therein that the same may conform to the record of the case in the Patent Office.

Signed and sealed this 28th day of May, A. D. 1929.

(Seal)

M. J. Moore,
Acting Commissioner of Patents.